Inventors
William P. Dalrymple
Burr W. Mantle
Henry A. Sherwood
By Wallace and Cannon
Attorneys United States Patent Office 2,746,555
Patented May 22, 1956

2,746,555

WHEEL DRIVE TRANSMISSION AND CLUTCH ARRANGEMENT

William P. Dalrymple, Rochester, Burr W. Mantle, Pittsford, and Henry A. Sherwood, Tarrytown, N. Y., assignors, by direct and mesne assignments, to Adrienne M. Sherwood, Tarrytown, N. Y.

Application September 5, 1950, Serial No. 183,178

10 Claims. (Cl. 180—10)

This invention relates to power transmitting arrangements and particularly to clutch and driving arrangements and the lubrication thereof.

It has been found to be advantageous to employ a chain drive in the power transmitting arrangements associated with an engine driven wheel for bicycles, tricycles and similar vehicles, but since the construction was such that it was not practical to house at least one chain drive of such a power transmitting arrangement in a housing in which a supply of lubricant could be maintained, resort has not been had to chain drives in power transmitting arrangements of the aforesaid kind even in instances where it would be advantageous so to do. This, of course, accrues from the difficulty of properly lubricating a chain and sprocket drive under the foregoing circumstances and in view of this, it is an important object of the present invention to effect lubrication of a chain and sprocket drive in a power transmitting arrangement of the aforesaid character without resorting to a closed housing for the chain and sprocket arrangement.

It is not only desirable to supply lubricant to a sprocket and chain arrangement of the aforesaid character but it is also necessary that only an adequate supply of lubricant be afforded, since otherwise, there might be an undesired spattering of the lubricant on the power transmitting arrangement or on the wheel or the vehicle in which it is included and even on the operator of the vehicle. Hence, another object of this invention is to accurately meter a quantity of lubricant supplied to a sprocket and chain arrangement as aforesaid. An ancillary object is not only to meter a lubricant supply but also to insure that an adequate pressure head is maintained so that proper lubrication may be effected. Yet another and related object is to so arrange a lubricating system of the aforesaid character that it will be effective to not only lubricate the aforesaid sprocket and chain arrangement but so that it will also be effective to lubricate bearings associated with a shaft on which one of the sprockets of the chain and sprocket arrangement is mounted.

In power transmitting arrangements for engine driven wheels adapted for use as aforesaid, it is advantageous to employ a clutch which may be automatically engaged as the engine driven wheel is set in operation and one which may also be manually engaged when the need so to do arises. It is therefore another object of this invention to utilize a normally dis-engaged clutch in a power transmitting arrangement of the aforesaid character and to so arrange the clutch that automatic engagement thereof will be effected when the engine driven wheel is operated at or above a predetermined speed. A related object is to so arrange a clutch of this nature that upon operation of the wheel below the predetermined speed automatic disengagement of the clutch will be effected. Yet another object is to so arrange a clutch of the aforesaid nature that it may be manually engaged and disengaged when so desired. Yet further objects are to so arrange the elements of a clutch that there will be telescoping parts capable of limited relative movement one to the other and to so arrange such parts that adjustment of the limited movement may be effected when desired as, for example, to compensate for wear; to so arrange the various elements of a clutch of the aforesaid nature that resort will not be necessary to key arrangements for interconnecting certain of the parts; and to so arrange a novel clutch of the aforesaid character that it will not be necessary to maintain close manufacturing tolerances on the various parts in the course of manufacture thereof.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

The novel arrangement of this invention is shown as incorporated in a power driven wheel adapted to be included as the front wheel of a bicycle or the like and which is of the general nature as that disclosed in the co-pending application of William P. Dalrymple, Serial No. 183,177, filed September 5, 1950. This arrangement includes a front wheel generally indicated by FW having a tire T mounted on the periphery thereof, the tire being mounted on a rim R, Fig. 4, that is welded or otherwise suitably secured to the peripheral portion of a disc D. The disc D has a centrally located opening therein and, around the edges of this opening, bolt holes as 10 are provided through which bolts as 11 are extended to connect the disc D to a brake housing 12 which includes a bearing portion 13 that is journaled for rotation on roller bearings 14 and 15 and disposed about an axle 16. The axle 16 is mounted in the lower end of a strut S as by having a head H at the inner end thereof disposed in a recess 17 formed in the strut S, said head H being welded or otherwise suitably secured in the recess 17. The axle 16 also includes a circular portion of a smaller diameter than the head H but of larger diameter than the reduced portion of the axle 16, the roller bearings 14 and 15 being mounted for rotation about this reduced portion. Shoulders as 18 and 19 on the interior of the bearing portion 13 are effective to retain the roller bearings 14 and 15 in operative position, outward movement of the roller bearing 14 being prevented by engagement thereof with a washer 20 that is retained in position by a nut 21 mounted on a reduced threaded portion at the outer end of the reduced portion of the axle 16. The engagement of the shoulder 18 with the inner edge of the bearing 14 is effective to prevent outward movement along the axle 16 of the brake housing 12. The brake housing 12 has a braking arrangement generally indicated by 22 housed therein, this braking arrangement desirably being in the nature of that disclosed in the aforesaid copending application of William P. Dalrymple.

The braking arrangement 22 embodies a torque plate 23 which includes a dished portion 24 and has a closed end 25 that has an opening therein that surrounds an enlarged portion of the axle 16, the end 25 being connected to the strut S in a suitable manner, as by welding. A lever 26 is mounted on the outer face of the torque plate 23 and has a clevis 27 near the outer end thereof to which one end of a Bowden cable 28 is connected, this cable being referred to in more detail hereinafter and being effective to operate the brake arrangement 22.

Figure 4:
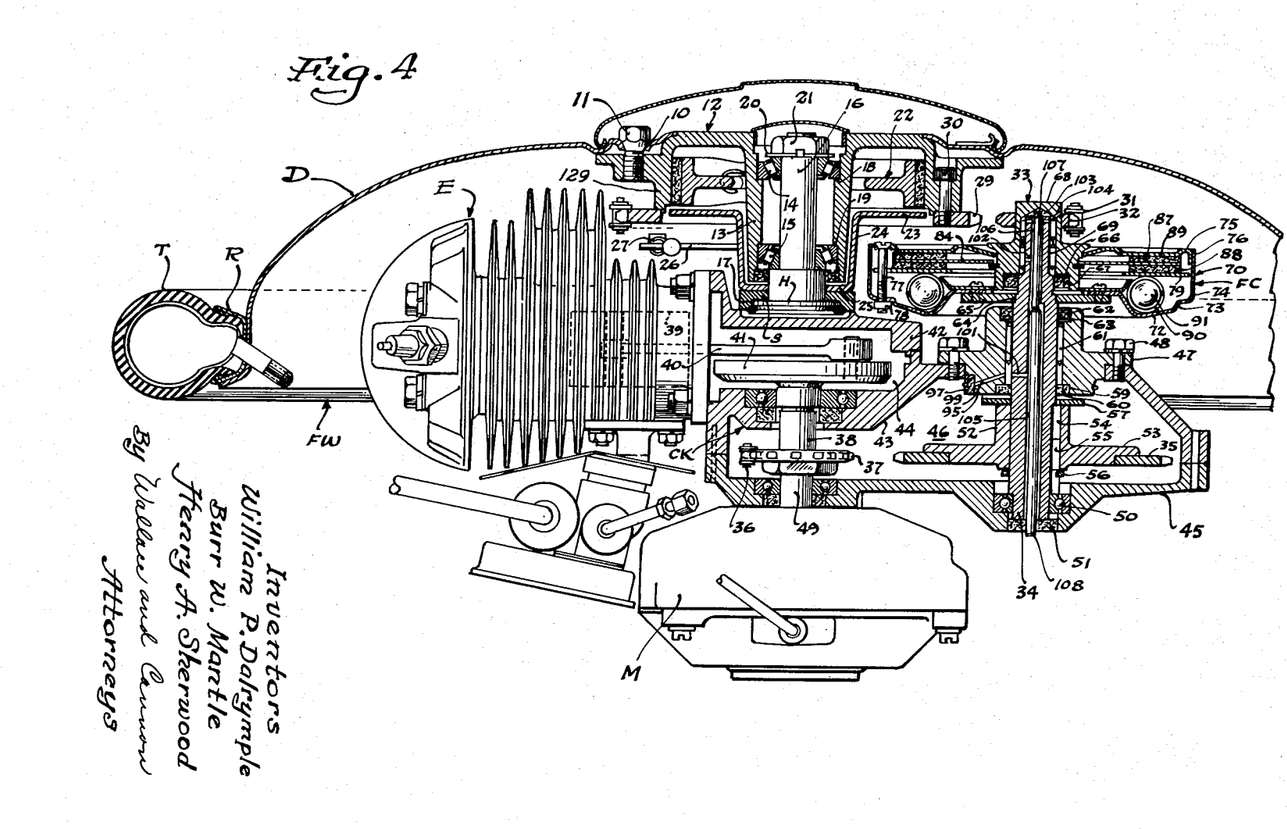
Fig. 4 is a horizontal sectional view taken substantially on the line 4—4 on Fig. 3.

Rotative movement is imparted to the brake housing 12 and disc D and the parts carried by the disc through a sprocket 29, Fig. 4, that is connected to the brake housing 12 by bolts 30. Rotative movement is imparted to the sprocket 29 through a chain 31 that passes thereabout, this chain also passing about a sprocket 32 mounted on the hub 33 of our novel friction clutch arrangement FC. In a manner described hereinafter, the hub 33 is connected by the clutch FC to the shaft 34 for rotation therewith when rotative movement is imparted to this shaft through the sprocket 35 about which a chain 36 is passed, this chain also passing about a sprocket 37 mounted on the crankshaft 38 of the engine E. The engine E is desirably a two-cycle engine and includes a piston 39 having a connecting rod 40 connected thereto, this connecting rod also being connected to a disc 41 on the crankshaft 38, the connecting rod being connected to the disc eccentrically thereof. The wall 42 of the crankcase CK of the engine E is suitably connected to the strut S on the face thereof opposite that from which the axle 16 projects and one portion of this wall 42 is connected to the lower end of the cylinder part of the engine E. The other wall 43 of the crankcase is also connected to the inner end of the cylinder part of the engine E and the walls 42 and 43 afford a chamber 44 in the crankcase into which a suitable lubricant may be introduced for the operative parts of the engine E.

An extension 49 of the crankshaft 38 of the engine E leads to a magneto M to operate this magneto when the engine E is in operation to thereby supply energy to the spark plug SP of the engine.

Another wall 45 is provided outwardly of the wall 43 and with the wall 43 encloses a chamber 46 in which the sprockets 35 and 37 and the chain 36 are disposed, an open side of the wall structure 45 being closed by a cap member 47 which is secured in position by bolts 48, certain of the bolts 48 also being effective to secure the wall 43 of the crankcase in association with the wall 42 thereof.

Figures 5, 6, 6A:
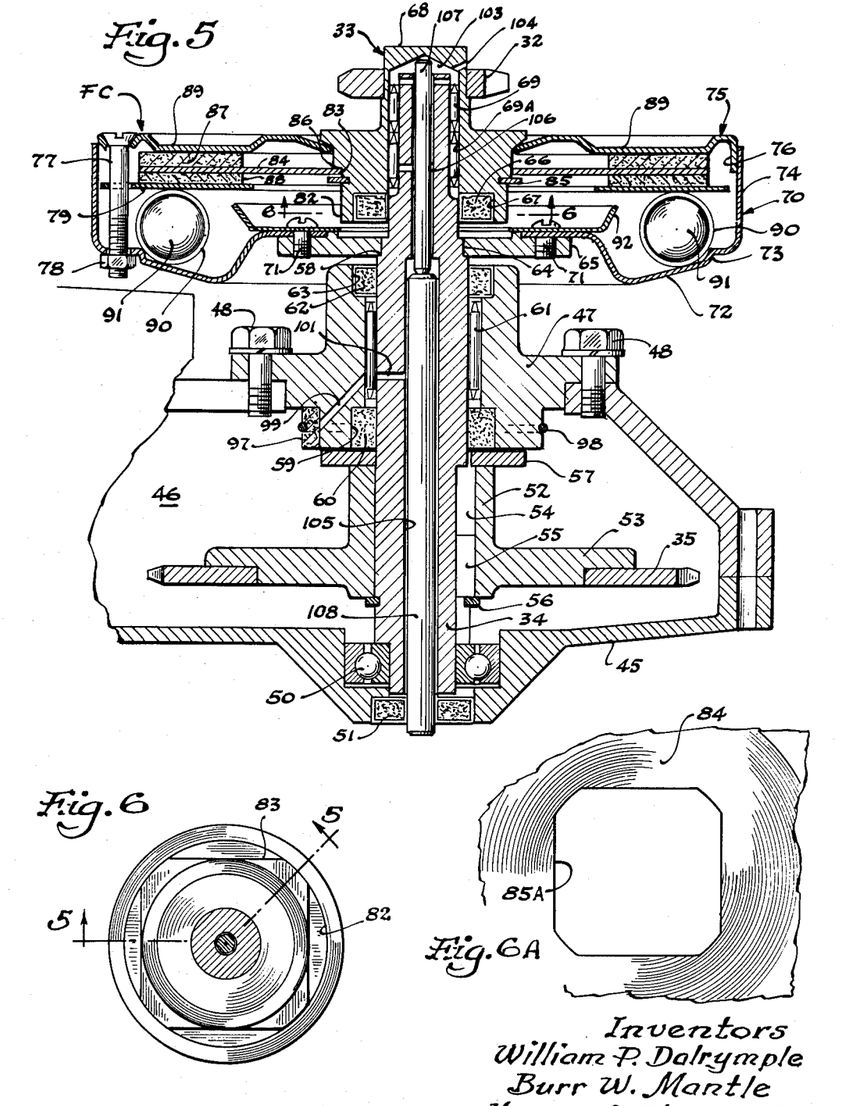
Fig. 5 is a sectional detail view of our novel clutch arrangement and which is taken substantially on the line 5—5 on Fig. 6 and showing a part of the mechanism illustrated in Fig. 4, Fig. 5 being drawn to a larger scale than Fig. 4.
Fig. 6 is a sectional detail view taken substantially on the line 6—6 on Fig. 5.
Fig. 6A is a detail view of a part of the apparatus illustrated in Figs. 5 and 6.

As best shown in Figs. 4 and 5, a ball-bearing 50 is mounted in the housing 45 and one end of the shaft 34 is journaled in this bearing, a seal 51 being provided outwardly of the bearing 50 and the end of the shaft 34 to prevent leakage of lubricant from the chamber 46. A hub 52 having a flange 53 thereon is disposed about the shaft 34 inwardly of the bearing 50 and, as best shown in Figs. 4 and 5, the sprocket 35 is connected to the flange 53. A keyway 54 is formed in the hub 52 and the adjacent portion of the shaft 34 to receive a key 55 which secures the hub 52 and flange 53 to the shaft 34. A lock washer 56 engages the end of the hub 52 adjacent the bearing 50 and prevents movement of the hub 52 along the shaft 34 in a direction toward the bearing 50.

A thrust washer 57 receives thrust of the hub 52 in a direction away from the bearing 50. This thrust washer 57 is held against movement along the shaft 34 by the engagement thereof with inner face of the cap 47 disposed about the shaft 34. A recess 59 is formed in the inner face of the cap 47 and suitable packing 60 is disposed therein to prevent oil leakage along the shaft 34.

A needle bearing 61 is disposed about the shaft 34 inwardly of the packing 60 and journals the shaft in the bearing portion of the cap 47. This needle bearing extends to further packing 62 disposed at a recess 63 formed in the outer end of the bearing portion of the cap 47.

Beyond the packing 62 the shaft 34 is reduced in diameter to define a shoulder 58 and a bearing surface 64. A plate 65 is mounted on the bearing surface 64 in engagement with the shoulder 58 and is welded to the shaft 34 in this position. Beyond the bearing portion 64 the shaft 34 is further reduced in diameter and this reduced diameter is disposed in a packing 66 provided in a recess 67 in the inner face of the hub 33. Immediately inward of the packing 66 the shaft 34 is further reduced in diameter to accommodate needle bearings 69 which journal the hub 33 for rotation about the adjacent end portion of the shaft 34.

A clutch housing 70 of the friction clutch FC is fast to the plate 65 by screws 71 and outwardly of the plate 65 the housing 70 is dished in the direction of the cap 47 and outwardly of this dish portion the housing is shaped to form an inwardly inclined ramp 72, a shoulder 73 being formed at the outwardly disposed end of the ramp. The clutch housing 70 terminates in a cylindrical flange 74. A cover plate 75 is provided for closing the open face of the clutch housing 70, this plate including a depending flange 76 that telescopes into the flange 74. At spaced intervals around the peripheral edge of the housing 70 and the cover plate 75, bolts as 77 are passed through openings respectively provided in the plate and housing. The enlarged head of each bolt 77 seats in a countersunk portion around each bolt opening in the plate 75 to thereby limit movement of the plate 75 away from the housing 70, a nut 78 being mounted on each bolt 77 outwardly of the housing 70, as best shown in Fig. 5, to insure such limitation of movement. The position of the nuts as 78 on the bolts as 77 is such that the cover plate 75 is capable of movement relative to the housing 70 for a purpose to be described presently.

Figure 2A:
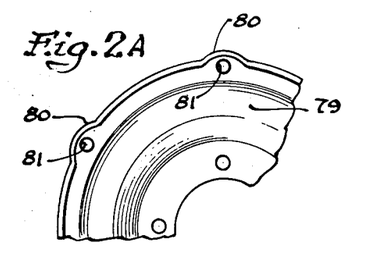
Fig. 2A is a fragmentary detail view showing a part of a clutch plate in the novel clutch of this invention.

The friction clutch FC includes a pressure plate 79, Figs. 2A and 5, which, at intervals around the periphery thereof, is provided with lobes 80 having openings 81 therein through which the bolts 77 are passed to thereby connect the pressure plate 79 to the clutch housing 70 so that the plate 79 moves with the housing 70. The inner portion of the pressure plate 79, as shown in Fig. 5, is cut away so as to clear the periphery of the hub 33. As best shown in Figs. 5 and 6, the inner end portion 82 of the hub 33 is circular in outline and this circular portion terminates in the portion 83 of the hub which, as shown in Fig. 6, is substantially rectangular in outline. A clutch plate 84 is mounted on the portion 83 of the hub 33 by having the opening 85 therein disposed about the portion 83, the opening 85A being complementary to the outline of the portion 83.

Outwardly of the portion 83 the hub is increased in diameter so as to define a shoulder 86 which is effective to limit movement of the clutch plate 84 in one direction along the portion 83. A lock washer 85 is mounted in a groove 86 formed in the portion 83 of the hub 33 and is disposed on the inner side of the clutch plate 84, and this ring is effective to prevent movement of the clutch plate 84 in a direction inwardly of the hub 33. The ring 85 serves a further function in the operation of the clutch FC, as will be described hereinafter. The peripheral margin of the plate 84 has friction facings 87 and 88 secured thereto, the friction facing 88 being adapted to cooperate with the pressure plate 79 while the friction facing 87 is adapted for cooperation with the clutch face 89 provided on the cover plate 75.

Figure 7:
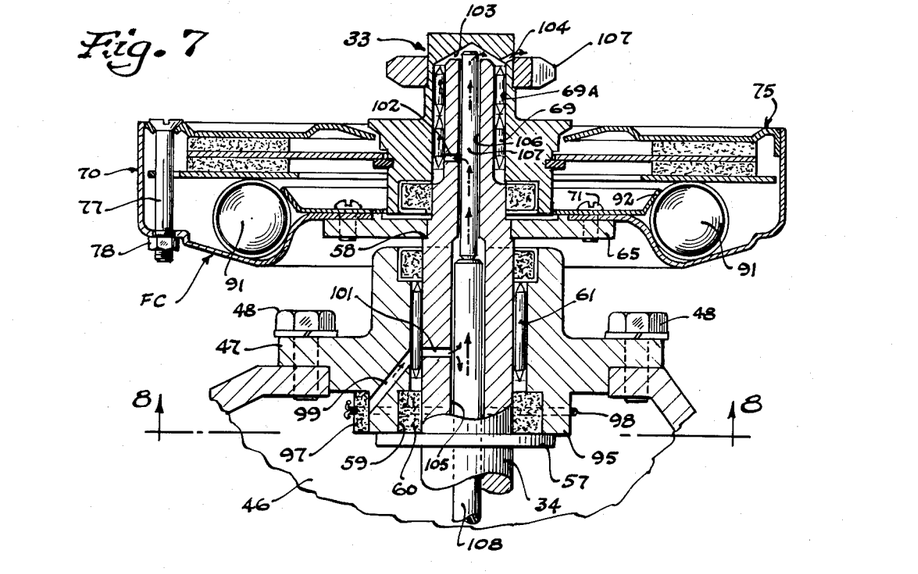
Fig. 7 is a sectional detail view somewhat similar to Fig. 5 but illustrating the novel lubricating system incorporated into our apparatus.

A garter spring 90 is provided in the space between the ramp 72 and the pressure plate 79. This garter spring 90 is filled with balls 91 which, under the influence of the spring, are normally held at the inner end of the ramp 72, as shown in Fig. 7. However, when the shaft 34 is set in rotation so as to thereby cause the clutch housing 70 to rotate therewith, the balls 91 move outwardly along the ramp 72 under the influence of centrifugal force. By reason of the inwardly inclination of the ramp 72 such movement of the balls is effective on the pressure plate 79 to force the same into engagement with the friction facing 88, and this in turn forces the friction facing 87 into engagement with the clutch face 89. By reason of the inter-connection of the clutch plate 84 with the portion 83 of the hub 33 the aforesaid engagement of the friction facings connects the hub 33 to the shaft 34 for rotation therewith. When rotation of the clutch housing 70 is interrupted, then under the influence of the garter spring 90 the balls 91 move inwardly along the ramp 72 and in so doing permit the friction facings 87 and 88 to disengage from the parts with which they cooperate, and thereby the clutch is disengaged. In order to insure proper location of the garter spring 90 and the balls 91 in the inner position thereof, a plate 92 is fast to the clutch housing 70 and this plate includes the peripheral flange which in cooperation with the dished portion of the housing 70 affords a seat for the spring 90 and the balls 91 in the inner and disengaged position thereon.

In view of the telescoping of the flange 76 on the cover plate 75 into the flange 74 on the clutch housing 70 and the inner connection of this plate and housing through the bolt and nut devices 77 and 78, a clutch arrangement is provided which may be easily and expeditiously adjusted when needed to compensate for wear or the like. Furthermore, this arrangement is such that a high degree of accuracy need not be maintained in the manufacture of the elements of the clutch since rather liberal manufacturing tolerances are permitted and variations are taken up by the aforesaid novel adjustment.

Another important advantage of the clutch in the present invention accrues from the use of the clutch in an arrangement such as that described hereinabove, that is to say, an engine driven wheel for a bicycle, tricycle or other vehicle. During the time the clutch is engaged under the effect of operation of the engine E it is always prepared to release in the event of engine ceasure or other stoppage since the garter spring 90 is at all times effective to urge itself and the balls 91 inwardly into clutch disengaged position.

As thus far described, friction clutch FC is arranged for automatic engagement and disengagement under the effect of centrifugal force on the balls 91 and spring 90. There may be instances, however, where it will be desirable to manually engage the clutch so as to thereby connect the hub 33 to the shaft 34. To this end an axial bore 105 extends through the shaft 34 from the free end thereof to a point adjacent the provision of the bearing surface 64 thereon. Another axial bore 106 of smaller diameter than the axial bore 105 leads from the inner end of the bore 105 to the other end of the shaft. A pin 107 is mounted in the bore 106 and has the outer end thereof engaged with the closed end 68 of the hub 33.

The other end of the pin 107 is engaged by a pin 108 mounted in the axial bore 105 and extended through the seal 51 to be extended outwardly of the housing 45.

When the pin 108 and therefore the pin 107 are pushed inwardly toward the closed end 68 of the hub 33, the hub moves along the shaft 34 and in so doing brings the ring 85 into engagement with the clutch plate 84 and this is effective to force friction facing 87 into engagement with the clutch face 89 whereby the hub 33 is connected to shaft 34 for rotation therewith. When the pressure effective to urge the pins 107 and 108 inwardly is relieved, then the hub 33 moves inwardly along the shaft 34 to disengage the clutch, this being brought about by reason of the tendency of the clutch elements to disengage and also this inward movement of the hub 33 is brought about by reason of the action of the chain 31 on the sprocket 32.

Figures 1, 2:
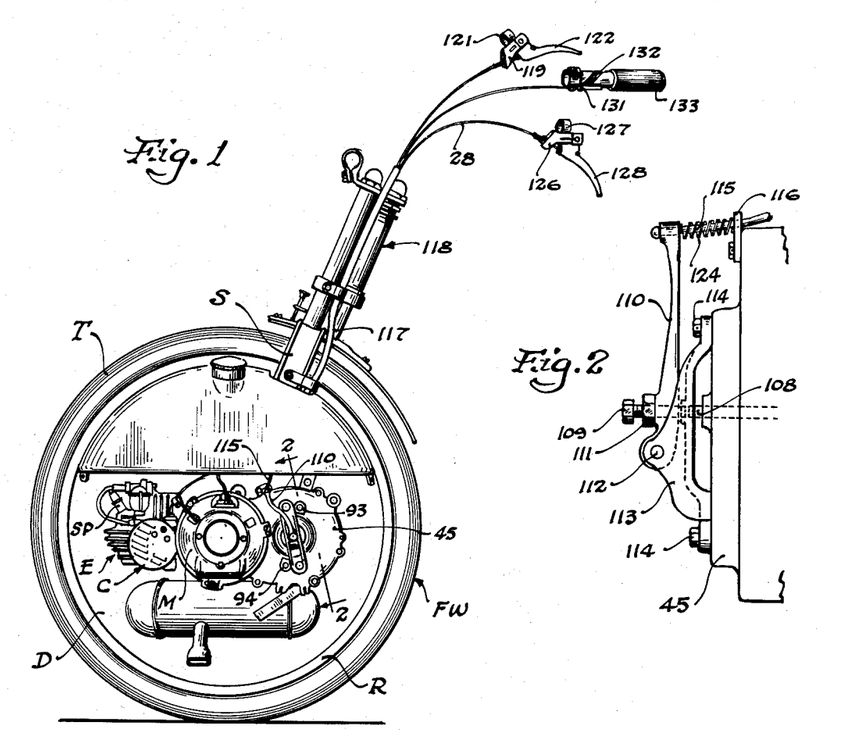
Fig. 1 is a side elevational view of an engine driven wheel adapted to be incorporated into a bicycle or the like and in which our novel arrangement has been incorporated.
Fig. 2 is a detail view taken substantially on the line 2—2 on Fig. 1.
Figure 3:
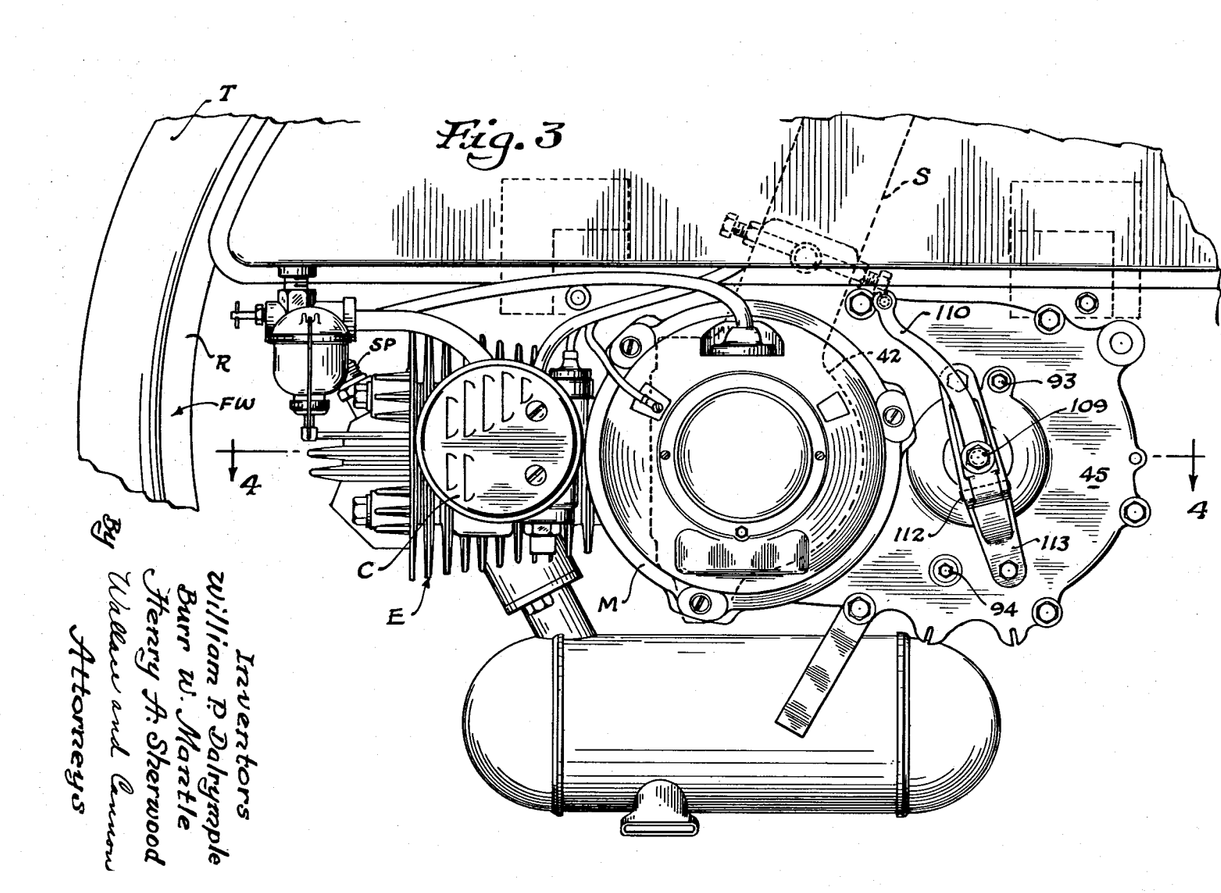
Fig. 3 is a side elevational view showing the engine and associated mechanisms and looking in the same direction as Fig. 1, Fig. 3 being drawn to a larger scale than Fig. 1.

The pressure that is effective to bring about the above described manual engagement of the friction clutch FC is exerted on the outer end of the pin 108 by an adjusting screw 109, Figs. 1, 2 and 3, mounted in a rocker 110 and held in a predetermined position by a locknut 111. The rocker 110 is pivotally mounted as indicated at 112 on a bracket 113 and is secured by bolts 114 to the outer face of the housing 45. When the rocker 110 is moved in clockwise direction as viewed in Fig. 2, the inner end of the screw 109 engages the pin 108 and effects engagement of the clutch as described above.

Clockwise movement of the rocker 110 as just described is imparted thereto through a Bowden cable 115 which leads from the free end of the rocker 110 to a support 116 in which the housing of the cable is secured. The Bowden cable 115 is directed to a rubber tube 117, Fig. 1, which extends up past the shock absorbing arrangement provided at the upper end of the strut S and adapted to be mounted in the steering column of the bicycle, such shock absorbing apparatus being generally indicated by 118 in Fig. 1 as being described in detail in the aforesaid copending application of William P. Dalrymple. The Bowden cable 115 leads from the upper end of the tube 117 to a rocker 119 mounted on the clamping structure 121; the rocker includes a grip portion 122. The clamping portion 121 is adapted to be connected to the right hand portion of the handle bar of the bicycle in which our novel arrangement is to be incorporated and when it is so mounted and the grip portion 122 is moved toward the handle bar, the resulting movement of the rocker 121 is effective to urge the cable 115 in a direction such that the rocker 110 is moved clockwise, as viewed in Fig. 2. A spring 124 is disposed about the Bowden cable 115 and extends between the rocker 110 and the bracket 116 and is effective to bias the rocker 110 in a counter-clockwise direction, as viewed in Fig. 2. Hence, when the grip portion 122 is released the spring 124 is effective to restore the Bowden cable 115 and the parts associated therewith to the inoperative positions thereof.

Manual engagement of the friction clutch FC is effected when our novel clutch is incorporated in a power transmitting arrangement for an engine driven wheel or the like, when it is desired to set the engine in operation by reason of rotation of the wheel to be driven thereby. Thus, since our novel clutch is normally disengaged, it is possible to operate the wheel with which it is associated without operating the associated engine. When, however, the grip portion 122 of the rocker 119 is moved to impart movement to the rocker 110 through the Bowden cable 115, then, as described hereinabove, the clutch FC is engaged and when so engaged, rotation of the wheel will cause the piston of the engine to reciprocate in the cylinder thereof and since the magneto M will also be set in operation at this time, this enables the engine E to be set in operation. As soon as the engine E is operating at a rate sufficient to propel the wheel FW at a predetermined speed, then the grip portion 122 may be released and the spring 124 will restore this grip portion and other parts associated with the Bowden cable 115 to the at-rest positions thereof, but by this time centrifugal force will have been effective upon the garter spring 90 and the balls 91 so that these will now be in position to continue the clutch FC in engagement.

It will be understood that the foregoing is exemplary of the manner in which the novel clutch of the present invention may be employed, for, obviously, there are many other applications for a clutch of this general nature, and our novel clutch is suitable for use in such other applications.

Figure 2B:
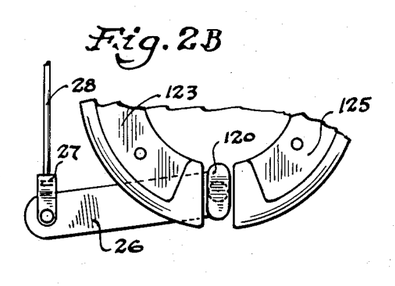
Fig. 2B is a detail view of the brake operating cam and associated parts.

Manual means are provided for effecting engagement of the brake and such means include a Bowden cable 28, Fig. 1, that leads to one end of a rubber tube 117 and the cable 28 is directed out of the upper end of the tube and is extended to a rocker 126 that is mounted on a clamping arrangement 127, the rocker including a grip portion 128. When the clamping arrangement 127 is secured to the left hand portion of the handle bar of a bicycle, then a grip portion 128 may be grasped to thereby rotate the rocker 126 in a direction such that the Bowden cable 28 is effective to move the brake lever 26, the Bowden cable 28 being connected to the clevis 27 on this lever. The lever 26 is connected to the brake operating cam 120, Fig. 2B, that is disposed between the brake shoes 123 and 125 that are mounted for rocking movement on the torque plate 23, the cam 120 being effective to move the shoes 123 and 125 into engagement with the brake drum 129, Fig. 4, to thereby effect deceleration of the vehicle when so desired.

In order to control the speed of the engine E, a Bowden cable leads from the throttle valve of the carburetor C of the engine E through the rubber tube 117 to a cam follower 131 mounted for movement in the cam groove 132 provided in the periphery of the rotatable hand grip 133 mounted on the handlebar adjacent the clamp 121. Rotative movement of the grip 133 causes the follower 131 to move along in the cam groove and, dependent upon the direction of rotation of the grip 133, this is effective to adjust the carburetor so as to cause the engine E to operate at the desired speed.

In order to insure proper lubrication of the needle bearings 61 and 69 and also to afford lubrication for the sprocket 32 and the chain 31 passed thereabout and so in turn for the sprocket 29, a supply of lubricant is introduced into the chamber 46 by removing the plug 93, Fig. 1, from the opening in which it is normally mounted and thereupon lubricant may be introduced into the chamber 46 through this opening. When lubricant is so being introduced into the chamber 46 another plug 94, Fig. 3, is removed from the opening in which it is normally mounted and lubricant is supplied to the chamber 46 until it runs out through the opening in which the plug 94 is normally mounted and this insures that a proper supply of lubricant is afforded in the chamber 46.

Figure 8:
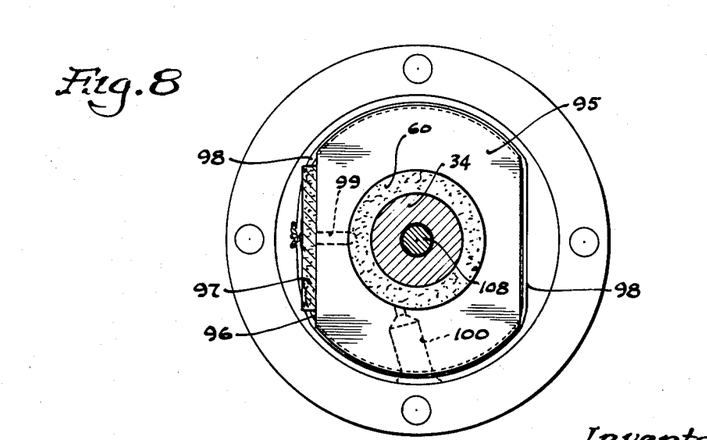
Fig. 8 is a sectional detail view taken substantially on the line 8—8 on Fig. 7.

In order to supply lubricant to the needle bearings and other elements, the inner end portion 95, Figs. 7 and 8, of the cap 47 is flattened as indicated at 96. A felt pad 97 is mounted on one of the flat faces 96, as shown in Fig. 8. The pad 97 is retained in this position by a retaining wire 98 which passes thereover and also over the other face 96 and the intermediate parts of the portion 95 of the cap 47.

A passage 99 leads from the face 96 on which the pad 97 is mounted so that one end thereof is in communication with this pad. The opposite end of this passage communicates with the packing 60 in the recess 59 which in turn is in communication with the chamber in the bearing portion of the cap 47 in which the needle bearing 61 is mounted. It has been observed in the course of operation of the engine E and the parts driven thereby that pressure in the chamber 46 will vary materially. Inasmuch as pressure in the chamber 46 affects the supply of lubricant from this chamber to the pad 97, it is desirable to insure that a balanced pressure is maintained on both sides of the pad 97. To this end an opening 100, Figs. 7 and 8, leads from the recess 59 to the periphery of part 95 of the cap 47. Thus, the outer end of the opening 100 is in communication with the chamber 46 and since the passages 99 and 100 are interconnected through the recess 59, in which the packing 60 is mounted, it will be apparent that pressure on the inner face of the pad 97 will be equal with the pressure applied on the outer face thereof. It will be understood that lubricant is supplied to the outer face of the pad 97 in the course of rotation of the flange 53 and sprocket 35 thereon and the movement of the chain 36. This insures that a constant supply of lubricant is afforded to the pad 97.

In order to supply lubricant from the chamber in which the needle bearing 61 is mounted to the chamber in which the needle bearings 69 are mounted, a passage 101 is formed in the shaft 34 to communicate with the centrally located bore in this shaft in which the pin 108 is slidably mounted so as to have a clearance between the bore 105 and this pin. Therefore, lubricant flows from the aforesaid chamber through a passage 101 and along through the central bore in the shaft 34.

In order to supply lubricant to the chamber 69A in which the needle bearing 69 is mounted, a passage 102 leads from the reduced portion of the central bore in the shaft 34 to said chamber 69A and in this way lubricant is supplied to the needle bearings 69. As best shown in Figs. 7 and 8, the chamber 69A communicates with a chamber 103 in the outer end of the hub 33. A passage 104 leads from the chamber 103 to a point adjacent one side of the sprocket 32. Hence, lubricant supplied to the chambers 69A and 103 may flow through the passage 104 onto the sprocket 32 to thereby lubricate this sprocket, the chain 31 that passes thereabout and also the sprocket 29 about which the chain 31 also passes.

The pad 97 acts as a fountain for our novel lubricating system and in view of the balancing of pressures on opposite sides of this pad, in the manner explained hereinabove, a constant pressure head is afforded for the lubricating system. Moreover, the flow of lubricant through the system is metered not only by the pad 97 but also by regulating the size of the openings in the system. In this way it is assured that an adequate supply of lubricant is supplied to the sprocket 32, chain 31 and sprocket 29, even though these parts do not operate in a housing in which a supply of lubricant can be maintained. Furthermore, the metering of the lubricating system is such that an excessive or objectionable amount of lubricant is not supplied to the chain 31 and the sprockets 29 and 32.

Of course, our novel lubricating system not only affords an adequate and proper supply of oil to the sprocket 32 and associated parts but it also insures a proper and adequate supply of lubricant to the bearings for the clutch driving shaft and parts driven by the clutch.

It will be manifest from the foregoing description that our novel arrangement enables the hereinabove set forth and kindred objects of this invention to be realized. Thus, a friction clutch is afforded which is arranged for either automatic or manual engagement and disengagement, and this clutch is so arranged that it may be easily adjusted in view of the telescoping of the housing parts and the interconnection of the cover plate and the clutch housing through adjustable bolt and nut devices. This arrangement also avoids the necessity of maintaining close manufacturing tolerances and yet at the same time insures accurate and positive operation.

While we have shown our novel clutch being used in the driving of an engine driven wheel, it will be understood that this is only one advantageous use to which our clutch may be put since it is capable of use whenever desired.

We have also provided a lubricating system for parts associated with the aforesaid novel friction clutch, and this novel lubricating system is so arranged that it will supply oil to a sprocket and chain arrangement that is not enclosed in the housing and in this way proper lubrication of the chain and sprocket arrangement is insured.

Other and further advantages of the present invention will be apparent from the foregoing description and while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a vehicle having a rotatable wheel carrying an engine for driving the same, power transmitting means for connecting the engine to the wheel to drive the same and embodying a clutch shaft adapted to be connected to said engine to be rotated thereby upon operation of the engine, a normally disengaged clutch structure mounted on said clutch shaft and including a clutch face adapted for rotation with said shaft, said clutch also including a hub rotatably mounted on said clutch shaft, a clutch plate connected to said hub inwardly of said clutch face, automatic means responsive to centrifugal force and effective to cause the clutch plate to engage said clutch face to thereby connect said hub to said clutch shaft for rotation therewith, means for connecting said hub to said wheel to effect rotation of said wheel when said hub is connected to said clutch shaft for rotation therewith, and means for manually engaging the clutch, the last-named means including a pin extended through the clutch shaft and adapted upon axial movement relative thereto to move said hub along said clutch shaft until said clutch plate engages said clutch face.

2. In a vehicle having a rotatable wheel carrying an engine for driving the same, power transmitting means for connecting the engine to the wheel to drive the same and embodying a clutch shaft adapted to be connected to said engine to be rotated thereby upon operation of the engine, a clutch structure mounted on said clutch shaft and including a clutch face adapted for rotation with said shaft, said clutch also including a hub rotatably mounted on said clutch shaft, a clutch plate connected to said hub inwardly of said clutch face, centrifugal weights responsive to centrifugal force and effective to couple said clutch plate and said clutch face to thereby connect said hub to said clutch shaft for rotation therewith, means for connecting said hub to said wheel to effect rotation of said wheel when said hub is connected to said clutch shaft for rotation therewith, and manually operable means for effecting engagement of the clutch until the automatic means is effective so to do, the last-named means including a pin extended axially through the clutch shaft and adapted upon axial movement therein in the direction of said hub to move the latter along the clutch shaft whereby the clutch plate and clutch face are caused to engage.

3. In a vehicle having a rotatable wheel carrying an engine for driving the same, power transmitting means for connecting the engine to the wheel to drive the same and embodying a clutch shaft adapted to be connected to said engine to be rotated thereby upon operation of the engine, a clutch housing fast on said clutch shaft for rotation therewith and having an open side, a removable cover cap for closing the open side of the clutch housing, means for adjustably securing the cover cap to the clutch housing for rotation therewith and limited relative movement with respect thereto, a hub rotatably mounted on said clutch shaft adjacent one end thereof and including a portion extended beyond the clutch housing, a clutch plate in said clutch housing and connected to said hub, a pressure plate in said clutch housing, friction facings on said clutch plate adapted respectively to cooperate with a clutch face on said pressure plate and a clutch face on said cover cap, means in said housing responsive to centrifugal force and effective on said pressure plate to engage said friction facings with the respective clutch faces on the pressure plate and cover cap to thereby connect the hub to the clutch shaft for rotation therewith, means for connecting said hub to said wheel to effect rotation of said wheel when said hub is connected to said clutch shaft for rotation therewith, and means for effecting engagement between said clutch plate and said clutch face including a pin extended axially through said clutch shaft to said hub, and means for moving said pin toward said hub to advance said hub axially along said clutch shaft to carry said clutch plate into engagement with said clutch face.

4. In a vehicle having a rotatable wheel carrying an engine for driving the same, power transmitting means for connecting the engine to the wheel to drive the same and embodying a clutch shaft adapted to be connected to said engine to be rotated thereby upon operation of the engine, a clutch housing fast on said clutch shaft for rotation therewith and having an open side, a removable cover cap for closing the open side of the clutch housing, means for adjustably securing the cover cap to the clutch housing for rotation therewith and limited relative movement with respect thereto, a hub rotatably mounted on said clutch shaft at one end thereof and including a portion extended beyond the clutch housing, a clutch plate in said clutch housing connected to said hub, inwardly of said cover cap and adapted to frictionally engage a clutch face on said cover cap, automatic means mounted in said housing for movement in response to centrifugal force and effective upon such movement to engage said clutch plate with said clutch face on said cover cap to thereby connect said hub to said clutch shaft for rotation therewith, means for connecting said hub to said wheel to effect rotation of said wheel when said hub is connected to said clutch shaft for rotation therewith, and manually operable means for effecting engagement of the clutch until the automatic means is effective so to do, the last-named means including a pin extended axially through the clutch shaft and adapted upon axial movement therein in the direction of said hub to move the latter along the clutch shaft whereby the clutch plate and clutch face are caused to engage.

5. In combination with a rotatable wheel carrying an engine for driving the same, power transmitting means for connecting the engine to the wheel to drive the same and embodying a clutch shaft connected to said engine to be rotated thereby upon operation of the engine, a clutch structure mounted on said clutch shaft and including a clutch face adapted for rotation with said shaft, said clutch also including a hub rotatably mounted on said clutch shaft, said clutch also including a clutch plate on said hub, automatic means responsive to centrifugal force and effective to engage said clutch face and said clutch plate to thereby connect said hub to said clutch shaft for rotation therewith, said clutch shaft having an axial bore therein, and manually operable means including a pin mounted in said bore and effective on said hub to advance the hub along the clutch shaft to engage the clutch plate and clutch face and thereby effect rotation of the hub with the clutch shaft.

6. In a vehicle having a rotatable wheel carrying an engine for driving the same, power transmitting means for connecting the engine to the wheel to drive the same and embodying a clutch shaft adapted to be connected to said engine to be rotated thereby upon operation of the engine, a clutch structure mounted on said clutch shaft and including elements adapted for rotation with said shaft, said clutch also including a hub rotatably mounted on said clutch shaft, means responsive to centrifugal force when said wheel is operating at or above a predetermined rate of speed and effective to engage said clutch to thereby connect said hub to said clutch shaft for rotation therewith, means for connecting said hub to said wheel to effect rotation of said wheel when said hub is connected to said clutch shaft for rotation therewith, said clutch shaft having an axial bore therein, and manually operable means including a pin mounted in said bore and effective on said hub to engage the clutch and thereby effect rotation of the hub with the clutch shaft.

7. In combination with a rotatable wheel, a strut for connecting the wheel to the frame of a bicycle or similar vehicle, an axle on said support, means journaling the wheel for rotation about the axle, an engine including a crankcase connected to said support, said engine embodying a crankshaft extended exteriorly of said crankcase into a housing means, a sprocket on the portion of said crankshaft extended into said housing means, said housing means being connected to said crankcase and carrying a bearing structure, a clutch shaft journaled in said bearing structure, a sprocket on said clutch shaft interiorly of said housing means, a chain connecting the aforesaid sprockets for conjoint rotation upon operation of the engine, a clutch housing fast on said clutch shaft for rotation therewith and having an open side, a removable cover cap for closing the open side of the clutch housing, means for adjustably securing the cover cap to the clutch housing for rotation therewith and limited relative adjusting movement inwardly with respect thereto, a hub rotatably mounted on said clutch shaft on the portion thereof extended exteriorly of said housing means, a clutch plate in said clutch housing and connected to said hub, a pressure plate in said clutch housing, friction facings on said clutch plate adapted respectively to cooperate with a clutch face on said pressure plate and a clutch face on said cover cap, said clutch housing having a ramp thereon juxtaposed to pressure plate, automatic means disposed between said pressure plate and said ramp and operable under the influence of centrifugal force to move along said ramp and thereby effect engagement of said friction facings with the respective clutch faces on the pressure plate and the cover cap to thereby connect said hub to said clutch shaft, a sprocket on said hub, a sprocket connected to said wheel, a chain interconnecting the last-named sprockets for conjoint rotation upon engagement of said clutch, said clutch shaft having an axial bore therein, and manually operable means including a pin mounted in said bore and effective on said hub to advance the hub axially along said clutch shaft to engage said clutch independently of said automatic means.

8. In a vehicle or the like, a driven shaft to be lubricated, a housing for holding lubricant and affording a bearing for supporting the shaft, said shaft being mounted for rotation in said bearing with one end extended into said housing and the other end projecting from said housing, another shaft arranged in said housing to be lubricated and to drive the first-named shaft, a hub rotatably mounted on said other end of the first-named shaft, said bearing having a lubricating passage therein for lubricating the first-named shaft and the first-named shaft having a lubricating passage therein in communication with the first-named lubricating passage for lubricating said hub, an absorbent lubricating pad arranged about said bearing in said housing to serve as a lubricating fountain for metering lubricant from said housing into said lubricating passages, and means in said bearing in communication with said housing for equalizing the pressure on either side of said pad.

9. In a vehicle or the like, a driven shaft to be lubricated, a housing for holding lubricant and affording a bearing for supporting the shaft, said shaft being mounted for rotation in said bearing with one end extended into said housing and the other end projecting from said housing, another shaft arranged in said housing to be lubricated and to drive the first-named shaft, a hub rotatably mounted on said other end of the first-named shaft, said bearing having a lubricating passage therein for conducting lubricant to the first-named shaft and the first-named shaft having a lubricating passage therein in communication with the first-named lubricating passage for conducting lubricant to said hub, and an absorbent lubricating pad arranged about said lubricating passage in the bearing for metering lubricant from said housing into said lubricating passages.

10. A clutch of the character described comprising a clutch housing secured to a shaft for rotation therewith and having an open side, an annular flange on said clutch housing defining the open side thereof, a circular cover cap having a clutch face for closing the open side of the clutch housing, said cover cap having an annular flange telescoped into the annular flange of the clutch housing whereby the cover cap may be removably mounted on the clutch housing, means for securing the cover cap to the clutch housing for rotation therewith and limited relative adjusting movement inwardly with respect thereto, a hub rotatably mounted on the shaft to which said clutch housing is to be secured and adapted to slide axially therealong within limits, a clutch plate in said clutch housing connected to said hub for rotation therewith and having friction means thereon for engaging said clutch face, a pin mounted axially in said shaft for axial movement therein and adapted in said movement to engage said hub to advance the same along said shaft until the clutch engages.

References Cited in the file of this patent

UNITED STATES PATENTS

| | | |
|---|---|---|
| 782,276 | Roebling | Feb. 14, 1905 |
| 807,731 | Dodge | Dec. 19, 1905 |
| 834,499 | Sturtevant | Oct. 30, 1906 |
| 1,160,919 | Lowenberg | Nov. 16, 1915 |
| 1,272,648 | Ferguson | July 16, 1918 |
| 1,394,516 | Burlat et al. | Oct. 18, 1921 |
| 1,663,607 | Naul | Mar. 27, 1928 |
| 1,842,820 | Chryst | Jan. 26, 1932 |
| 2,239,161 | Wemp | Apr. 22, 1941 |
| 2,251,588 | Gilbert | Aug. 5, 1941 |
| 2,331,976 | Hare | Oct. 19, 1943 |
| 2,363,613 | Olcott | Nov. 28, 1944 |
| 2,368,299 | Hayter | Jan. 30, 1945 |
| 2,398,716 | Ojutkangas | Apr. 16, 1946 |
| 2,588,333 | Wilson | Mar. 4, 1952 |
| 2,588,889 | Sherwood | Mar. 11, 1952 |